United States Patent Office 2,919,288
Patented Dec. 29, 1959

2,919,288

PRODUCTION OF O.O-DIALKYLPHOSPHORIC ACID ESTERS OF SUBSTITUTED HALOGEN-BUTENOLS

Heinz Pohlemann, Ludwigshafen (Rhine), Herbert Stummeyer, Mannheim, and Heinrich Adolphi, Limburgerhof, Germany, assignors to Badische Anilin- & Soda-Fabrik Aktiengesellschaft, Ludwigshafen (Rhine), Germany No Drawing. Application January 6, 1958
Serial No. 707,118

12 Claims. (Cl. 260—461)

The present invention relates to a process for the production of new triesters of ortho-phosphoric acid or of ortho-thionophosphoric acid. More specifically it relates to the production of new O.O-dialkylphosphoric or O.O-dialkylthionophosphoric acid esters of substituted halogen-butenols.

It is known that triesters of phosphoric acid are obtained by reacting dialkoxyphosphoric acid monohalides or dialkoxythiophosphoric acid monohalides with alcohols or phenols. Thus from the U.S. patent specification No. 2,536,647 it is known for example, to cause the alkali salt of para-nitrophenol to act on the bis-(beta-chlorethyl)-thiophosphoryl chloride obtainable by the reaction of sulfur with chlor-bis-(beta-chlorethyl)-phosphite, bis-(beta-chlorethyl)-para-nitrophenyl-thionophosphate being formed. The alcohols used for the reaction with phosphoric acid ester halides have been chosen from among saturated, unsaturated, straight-chain and branched-chain alcohols or thioalcohols. For example, by the reaction of methallyl alcohol or the alkali salts thereof with phosphoric acid ester halides, such as O-mono- or O.O-di-alkylphosphoric acid halides, the corresponding mono- or di-alkylmethallyl phosphates are obtained (cf. U.S. patent specification No. 2,176,416).

From the U.S. patent specification No. 2,394,829 it is known to prepare compounds of the allyl type phosphates of the general formula:

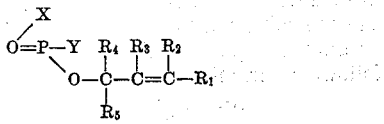

in which X and Y are identical or different radicals, such as halogen atoms or an OR-group, R a hydrocarbon radical which is cyclic or acyclic, saturated or unsaturated, and $R_1$, $R_2$, $R_3$, $R_4$ and $R_5$ are hydrogen atoms or alkyl, alkenyl, aryl, cycloalkyl, cycloalkenyl, aralkyl, aralkenyl or heterocyclic radicals which may be substituted by further radicals, such as halogen, nitro or amino groups, by reacting phosphorous oxy-halides of the general formula:

in which Z is a halogen atom and X and Y have the above significance, with an allyl type alcohol of the formula

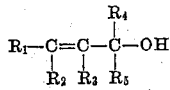

in which $R_1$, $R_2$, $R_3$, $R_4$ and $R_5$ have the meaning defined above, at temperatures of minus 25° C. to about minus 70° C.

Many of the triesters of phosphoric acid already prepared in great numbers have gained considerable importance for many applications. They are efficient insecticides and rodent-destroying agents. They can also be used as corrosion preventives, flameproofing agents, flotation agents, plasticizers or as additives for high pressure lubricants.

The main object of the present invention is the production of new O.O-dialkylphosphoric acid esters (which term is hereinafter to be understood as including also O.O-dialkylphosphoric acid esters) which have an outstanding effect as insecticides for practically all types of insects, especially sucking insects, such as aphides. Furthermore, the new substances have a destructive effect on eggs and larvae of the said pests, but do not affect warm-blooded animals except to a negligible degree. A further object of the invention is the production of such O.O-dialkylphosphoric acid esters as have a pronounced systemic action, i.e. the phosphoric acid ester is conveyed through the system of the plants to be protected against pests, without losing its action.

Yet another object of the invention is the provision of a simple and efficient process for making the said new phosphoric acid esters with good yield.

We have found that the said objects are achieved and new O.O.-dialkylphosphoric acid esters of substituted halogen-butanols are obtained by reacting an O.O-dialkylphosphoric acid monohalide of the general formula:

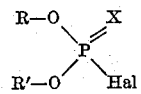

in which X is an oxygen or sulfur atom, Hal is a halogen atom, and R and R' represent lower saturated aliphatic hydrocarbon radicals with 1 to 4 carbon atoms, with a 3-halogen-butane-(3)-ol-(2) substituted in 1-position of the formula:

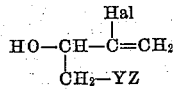

in which Hal is a halogen atom, Z represents a hydrogen atom or a saturated or unsaturated aliphatic hydrocarbon radical with 1 to 4 carbon atoms and Y is an oxygen or sulfur atom, a sulfone or sulfoxy group or an —NH— group.

The resultant new O.O-dialkylphosphoric acid esters of 3-halogen-butene-(3)-ols substituted in 1-position have the following general constitution:

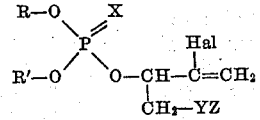

in which R, R', X, Hal, Y and Z have the above significance.

Suitable 3-halogen-butene-(3)-ol-(2) compounds substituted in 1-position are for example 1-alkoxy-3-halogen-butene-(3)-ol and 1-alkenoxy-3-halogen-butene-(3)-ols whose alkyl or alkenyl groups consist of 1 to 4 carbon atoms. Suitable compounds are for example 1-methoxy-3-chlorbutene-(3)-ol-(2), 1-methoxy-3-brombutene-(3)-ol-(2), 1-methoxy-3-iodobutene-(3)-ol-(2), and also the corresponding 1-ethoxy-, 1-propoxy-, 1-butoxy- and the 1-allyloxy- derivatives of 3-chlor, 3-brom- or 3-iodo-butene-(3)-ol-(2). Particularly suitable are also the derivatives of 3-halogen-butene-(3)-ol-(2) which contain in 1-position an alkyl- or alkenyl mono-substituted amino group of which the alkyl or alkenyl radical contains 1 to 4 carbon atoms. As representatives of such compounds there may be mentioned, for example, 1-methyl-amino-, 1-ethylamino-, 1-propylamino- and 1-butylamino-3-chlorbutene-(3)-ol-(2) and 1-allylamino-3-chlorbutene- (3)-ol-(2). 1-amino-3-chlorbutene-(3)-ol-(2) is also suitable.

Of the 3-halogen-butene-(3)-ol-(2) compounds which are substituted in 1-position by an aliphatic thiol group, for example by an alkyl or alkenyl mercapto radical (in which the sulfur atom may be oxidized to a sulfoxy or sulfone group) and their alkyl- or alkenyl groups may contain 1 to 4 carbon atoms there may be mentioned, for example, 1-ethylmercapto-, 1-ethylsulfoxy- and 1-ethyl-sulfonyl-3-chlorbutene-(3)-ol-(2).

Of the O.O-dialkylphosphoric acid monohalides to be used as the second reaction component the chlorides, bromides and iodides of O.O-dialkylphosphoric acids and O.O-dialkylthionophosphoric acids are especially suitable. The O.O-dialkylphosphoric acid monohalides are readily available compounds. For example, they can be obtained by reaction of phosphorus oxychloride or phosphorus thiotrichloride with the calculated amount of aliphatic monohydric alcohols. As representatives of these reaction components there may be mentioned above all dimethoxyphosphoric acid monochloride, dimethoxyphosphoric acid monobromide, dimethoxyphosphoric acid monoiodide, and also the corresponding halides of O.O-diethyl-, O.O-dipropyl- and O.O-dibutyl-phosphoric acid as well as the chlorides, bromides and diodides of O.O-dimethylthionophosphoric acid, O.O-diethylthionophosphoric acid, O.O-dipropylthionophosphoric acid and O.O-dibutylthionophosphoric acid.

The reaction is carried out by causing the two reaction components to act on each other. In general it is immaterial which component is added to the other. It is advantageous to add the dialkylphosphoric acid monohalide to the 3-halogen-butene-(3)-ol-(2) substituted in 1-position. The initial materials are used in about the equivalent amounts. Sometimes it may be advantageous, however, to use one or other initial material in a slight excess, for example of 1 to 10%. Working in the presence of an inert organic diluent may be preferable in some cases. Hydrocarbons, such as benzene, toluene, xylene, gasolines and cyclohexane or chlorohydrocarbons, as for example methylene chloride, chloroform, or ethylene chloride or carbon tetrachloride may serve for example as diluents. The amount of a diluent, when such is co-employed, is not critical and may vary within wide limits. In general only so much of these substances is used as is necessary to achieve an intimate mixing of the reaction components. Although the reaction occurs appreciably even at low temperatures, it is preferable to work at elevated temperatures, for example from about 15° to 120° C., and advantageously between about 40° and 50° C.

It is good practice to carry out the reaction in the presence of an agent capable of binding hydrogen halide, as for example pyridine, or other tertiary amines, having a boiling point above the reaction temperature, for example triethylamine or tributylamine, in order to bind the hydrogen halide set free during the reaction. Alkali carbonates or alkali bicarbonates may be coemployed for this purpose. Accordingly, the agents which bind hydrogen halide are preferably used in amounts which are equimolar to the O.O-dialkylphosphoric acid monohalides to be reacted.

The procedure in the reaction of the two reaction components may be, for example, to dissolve the substituted 3-halogen-butene-(3)-ol-(2) in one of the said diluents, to add to this solution the substance binding hydrogen halide and then to slowly introduce into this mixture the molar amount of the dialkylphosphoric acid monohalide corresponding to the halogen-butenol. To speed up the reaction it is advantageous to stir the components and to prevent a higher concentration of the phosphoric acid halide occurring locally anywhere in the reaction mixture. The ortho-phosphoric acid triesters or thionophosphoric acid triesters can be obtained from the reaction mixture in the conventional manner.

The new O.O-dialkylphosphoric acid esters of the substituted halogen-butenols are highly efficient insecticides and ovicides. Moreover, part of them have a markedly good systemic action. The esters are less toxic for warm-blooded animals than the conventional phosphoric acid ester type insecticides.

The following examples will further illustrate this invention but the invention is not restricted to these examples. The parts given in the examples are parts by weight.

*Example 1*

56.4 parts of diethoxythionophosphric acid monochloride are allowed to flow slowly at about 40° C. into a mixture of 40.8 parts of 1-methoxy-3-chlorbutene-(3)-ol-(2) and 23.7 parts of anhydrous pyridine with powerful stirring. After the addition is completed the whole is further stirred for about 5 hours at 40° to 45° C. in order to complete the reaction. The reaction mixture is then cooled to room temperature, and 30 to 40 parts of water and 50 parts of benzene are added thereto. After stirring the mixture thoroughly the non-aqueous layer is separated in a separating funnel. The separated layer is shaken with a little diluted hydrochloric acid and then with water, then dried over sodium sulfate and distilled. 75 parts of a compound of the boiling point 96° C. at 0.001 mm. Hg pressure are obtained as a colorless oil. The compound has the formula:

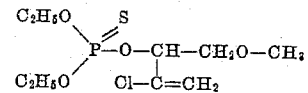

*Example 2*

188 parts of O.O-diethoxy-thionophosic acid monochloride are slowly added to 163 parts of 1-normal-propyl-amino-3-chlor-butene-(3)-ol-(2) and 101 parts of triethylamine with good stirring and the reaction temperature is kept below 42° C. by good cooling. After the reaction has ceased, the reactants are further stirred for 3 hours at 45° C. The reaction mixture is cooled to room temperature, 50 parts of water and 100 parts of benzene are added thereto, stirred well and the layers separated. The aqueous layer is again extracted with 60 parts of benzene and the extracts combined with the non-aqueous layer. The benzene solution obtained is washed with 50 parts of water, dried over sodium sulfate and the solvent distilled off in vacuo. There remain as a residue 241 parts of a reddish, non-distillable oil of the following formula:

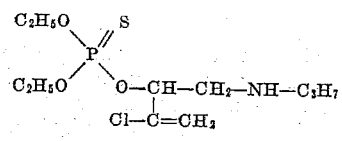

*Example 3*

56.4 parts of diethoxy-thionophosphoric acid chloride are allowed to flow slowly into a mixture of 49.8 parts of 1-ethylmercapto-3-chlor-butene-(3)-ol-(2) and 23.7 parts of anhydrous pyridine with good stirring. The temperature is prevented from rising above about 40° C. by cooling. The reactants are stirred for an additional 4 hours at 40° to 50° C. and worked up as specified in Example 1. After distilling off the solvent, there are obtained 91 parts of the new thionophosphoric acid ester as a pale yellowish oil of the formula:

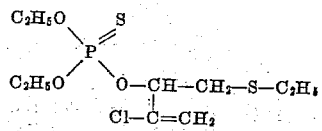

*Example 4*

32.1 parts of dimethoxythionophosphoric acid monochloride are allowed to flow at 30° to 40° C. while stirring into a mixture of 33.3 parts of 1-ethylmercapto-3-chlor-butene-(3)-ol-(2) and 15.8 parts of pyridine. The whole is further stirred for 4 hours at 40° to 50° C. The reaction mixture is cooled and 80 parts of methylene chloride added. The solution obtained is extracted twice, each time with 30 parts of water, and the organic layer is separated from the water and dried with sodium sulfate. The solvent is distilled off in vacuo and 40 parts of the compound of the formula:

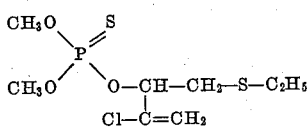

are obtained as a pale brown oil which can be distilled only with partial decomposition at the boiling point 95° to 100° C. at 0.5 mm. Hg pressure.

By working as above but using 41 parts of dimethoxythionophosphoric acid monobromide instead of 32.1 parts of dimethoxythionophosphoric acid monochloride, 43 parts of the compound obtainable according to paragraph 1 of this example are obtained.

Example 5

244 parts of dibutoxythionophosphoric acid monochloride are slowly introduced at a temperature of 35° to 45° C. while stirring well into a mixture of 163 parts of 1 normal-propylamino-3-chlor-butene-(3)-ol-(2), 500 parts of methylene chloride and 101 parts of sodium carbonate. The whole is then stirred for 16 hours at 50° C. The reaction mixture is cooled and worked up as described in Example 2. 342 parts of the compound of the formula

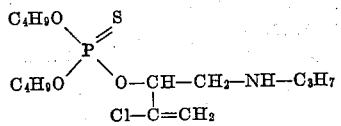

are obtained as a yellowish oil which can be distilled only with marked decomposition.

Example 6

216 parts of dipropoxythionophosphoric acid chloride are slowly introduced at 40° to 45° C. with powerful stirring into a mixture of 166 parts of 1-ethylmercapto-3-chlor-butene-(3)-ol-(2) and 79 parts of pyridine. After the introduction, the whole is further stirred for 5 hours at 45° C. and the reaction mixture worked up as specified in Example 4. 295 parts of the compound of the formula:

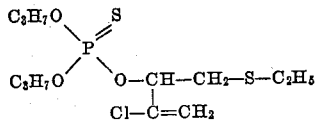

are obtained as a yellowish oil.

Example 7

163 parts of 1-normal-propylamino-3-chlor-butene-(3)-ol-(2) and 79 parts of pyridine are mixed and then at 30° to 40° C. while stirring 172 parts of diethoxyphosphoric acid chloride are allowed to flow in. The whole is further stirred for 4 hours at 50° C. and worked up as described in Example 2. 275 parts of the compound of the following formula are obtained as a pale oil:

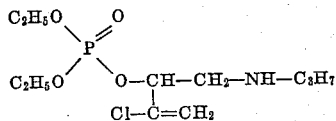

Example 8

36.3 parts of 1-amino-3-chlor-butene-(3)-ol-(2) and 23.7 parts of pyridine are well mixed and into the mixture 56.4 parts of diethoxythionophosphoric acid chloride are introduced at 45° to 50° C. while stirring powerfully. The stirring is continued for another 6 hours at 50° C., after which the reaction mixture is cooled and worked up as described in Example 2. 86 parts of a compound of the formula:

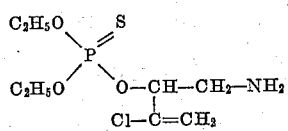

are obtained.

Example 9

56.4 parts of diethoxythionophosphoric acid chloride are allowed to flow at 35° to 40° C. while stirring well into a mixture of 48.3 parts of 1-allylamino-3-chlor-butene-(3)-ol-(2) and 23.7 parts of pyridine. The reaction is stirred for another 5 hours at 50° C., cooled to room temperature and worked up as described in Example 2. 67 parts of a yellowish oil are obtained to which the following formula applies:

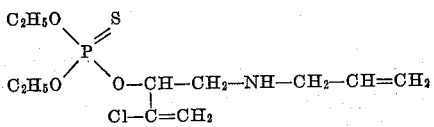

We claim:
1. The compound of the formula

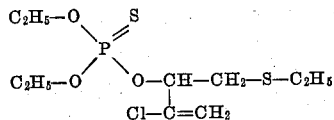

2. The compound of the formula

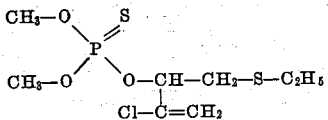

3. The compound of the formula

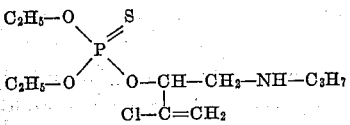

4. The compound of the formula

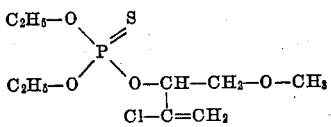

5. The compound of the formula

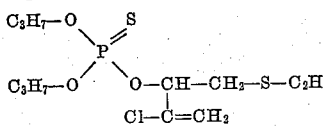

6. A process for the production of O.O.-dialkylphosphoric and O.O-dialkylthionophosphoric acid esters of the general formula

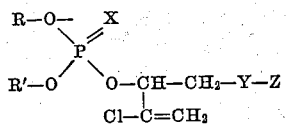

in which R and R' are alkyl groups with one to four C-atoms, X is an element of the group consisting of oxygen and sulfur, Z is a member of the class consisting of hydrogen and alkyl and alkenyl radicals with from one to four C-atoms, and Y is a member selected from the group consisting of oxygen, sulfur, and the —NH— group, which comprises reacting an O.O.-dialkylphosphoric acid monohalide of the formula

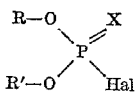

in which R and R' are alkyl groups with one to four C-atoms, X is an element of the group consisting of oxygen and sulfur, and Hal is a halogen atom selected from the group consisting of chlorine and bromine with an equivalent amount of a 1-substituted-3-chlorobutene-(3)-ol-(2) of the formula

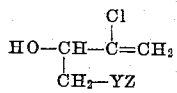

in which Y and Z have the aforesaid significance, in the presence of an agent capable of binding hydrogen halide at a temperature of from 15° to 120° C.

7. A process as claimed in claim 6 wherein the reaction is carried out in the presence of an inert organic medium.

8. A process for the production of O.O.-dialkylphosphoric and O.O-dialkylthionophosphoric acid esters of the general formula

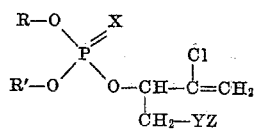

in which R and R' are alkyl groups with one to four C-atoms, X is an element of the group consisting of oxygen and sulfur, Z is a member of the class consisting of hydrogen and alkyl and alkenyl radicals with from one to four C-atoms, and Y is a member selected from the group consisting of oxygen, sulfur, and the —NH— group, which comprises reacting an O.O.-dialkylphosphoric acid monochloride of the formula

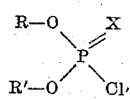

in which R, R' and X have the aforesaid significance, with an equivalent amount of a 1-substituted-3-chlorbutene-(3)-ol-(2) of the formula

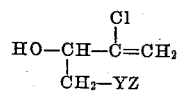

in which Y and Z have the aforesaid significance, in the presence of an agent capable of binding hydrogen chloride at a temperature of from 15° to 120° C.

9. The process as claimed in claim 6, wherein the reaction is carried out in the presence of an inert organic diluent.

10. A compound of the general formula

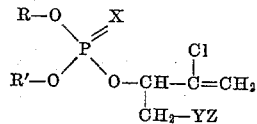

in which R and R' are alkyl groups with one to four C-atoms, X is an element of the group consisting of oxygen and sulfur, Z is a member of the class consisting of hydrogen and alkyl and alkenyl radicals with from one to four C-atoms, and Y is a member selected from the group consisting of oxygen, sulfur, and the —NH— group.

11. A compound of the general formula

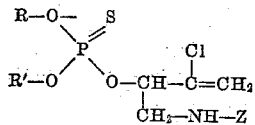

in which R and R' are alkyl groups with one to four C-atoms and Z is a member of the class consisting of hydrogen and alkyl and alkenyl radicals with from one to four C-atoms.

12. A compound of the general formula

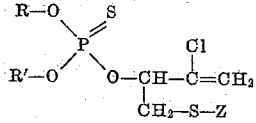

in which R and R' are alkyl groups with one to four C-atoms, and Z is a member of the class consisting of hydrogen and alkyl and alkenyl radicals with from one to four C-atoms.

No references cited.